US012153362B2

(12) United States Patent
Ikeno

(10) Patent No.: US 12,153,362 B2
(45) Date of Patent: Nov. 26, 2024

(54) DEVICE FOR IMAGE FORMING APPARATUS AND SPRING FOR THE DEVICE

(71) Applicant: BROTHER KOGYO KABUSHIKI KAISHA, Nagoya (JP)

(72) Inventor: Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/187,501

(22) Filed: Mar. 21, 2023

(65) Prior Publication Data

US 2023/0314986 A1 Oct. 5, 2023

(30) Foreign Application Priority Data

Mar. 30, 2022 (JP) ................................ 2022-055303

(51) Int. Cl.
*G03G 15/00* (2006.01)
*G03G 15/20* (2006.01)

(52) U.S. Cl.
CPC ..... *G03G 15/2017* (2013.01); *G03G 15/2064* (2013.01)

(58) Field of Classification Search
USPC .......................................................... 399/328
See application file for complete search history.

(56) References Cited

U.S. PATENT DOCUMENTS 9,310,736 B1 * 4/2016 Onishi ............... G03G 15/2064
2016/0306307 A1 10/2016 Ishida

FOREIGN PATENT DOCUMENTS

| | | | | | |
|---|---|---|---|---|---|
| GB | 2179005 | A | * | 2/1987 | ......... G03G 15/2092 |
| JP | 2005-041610 | A | | 2/2005 | |
| JP | 2009169131 | A | * | 7/2009 | |
| JP | 2009-192704 | A | | 8/2009 | |
| JP | 2009-192929 | A | | 8/2009 | |
| JP | 5892919 | B2 | * | 3/2016 | |
| JP | 2016-206344 | A | | 12/2016 | |

* cited by examiner

*Primary Examiner* — Quana Grainger
(74) *Attorney, Agent, or Firm* — Merchant & Gould P.C.

(57) ABSTRACT

A device for an image forming apparatus includes a frame, a first spring, and a second spring. The frame includes a boss. The first spring includes a coil, a first arm and a second arm. The first arm includes at an end thereof an electrical contact that contacts an electrode of a main housing. When the device is not attached to the main housing, the first spring is biased by the second spring and located in a retracted position. When the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode.

6 Claims, 6 Drawing Sheets

DEVICE FOR IMAGE FORMING APPARATUS AND SPRING FOR THE DEVICE

REFERENCE TO RELATED APPLICATIONS

This application claims priority from Japanese Patent Application No. 2022-055303 filed on Mar. 30, 2022. The entire content of the priority application is incorporated herein by reference.

BACKGROUND ART

A replaceable fixing device for an image forming apparatus comprising a metal spring (contact spring) for connecting components to be grounded is known in the art. The components are thereby electrically connected in a reliable manner even if one component moves relative to another component.

One example of such fixing device comprises a guide member for guiding a sheet at an outlet of the fixing device, a reinforcement plate for reinforcing the guide member, and a torsion coil spring for moving the guide member out of a sheet conveyor path. The reinforcement plate and the torsion coil spring are electrically connected irrespective of the motion of the guide member. Another example of such fixing device comprises a biasing member (mechanical spring) for exerting a mechanical force, an arm for pressing a heating unit against a pressure roller by the action of the biasing member, and a connecting portion for providing ground connection. The arm and the connecting portion are electrically connected by the biasing member and a spring (contact spring).

DESCRIPTION

In order to obtain a good electrical connection by a spring, it may be preferable to provide a sharp end on a member that forms the spring, and to cause the end to dig into a metal frame of a main housing to make the spring and the main housing electrically continuous. This makes it possible to scrape off any coating, layer of oxide, or dirt or the like on the metal frame by the end of the spring, and make the spring and the main housing electrically continuous with a small resistance.

However, if the sharp end of the spring is uncovered, the end of the spring is likely to get caught on objects other than the metal frame and the like that are to be made electrically continuous, and it will take time and effort to attach a fixing device to an image forming apparatus.

It would be desirable to provide a device for an image forming apparatus and a spring for the device that ensure a good electrical connection by the spring, and at the same time makes the device easy to attach to the image forming apparatus.

Thus, in one aspect, a device for an image forming apparatus disclosed herein comprises a frame, a first spring, and a second spring. The frame includes a boss. The first spring includes a coil fitted on an outer periphery of the boss and supported by the boss. The second spring mechanically biases the first spring in one direction of rotation in which the first spring is rotatable about the boss.

The first spring comprises a first arm and a second arm. The first arm extends from one end of the coil. The first arm includes at an end thereof an electrical contact configured to contact an electrode of a main housing of the image forming apparatus. The second arm extends from another end of the coil in a direction different from a direction in which the first arm extends.

When the device is not attached to the main housing, the first spring is biased by the second spring, whereby the electrical contact is located in a retracted position. When the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode.

According to such configuration, since the electrical contact at the end of the first arm is located in a retracted position when the device is not attached to the main housing, the electrical contact is less likely to get caught on other objects during assembly. On the other hand, when the device is being attached to the main housing, the second arm is pressed against the main housing and causes the first arm to rotate about the boss, whereby the electrical contact protrudes further outward of the frame than when the electrical contact is located in the retracted position. Therefore, it is easier to ensure electrical continuity between the electrical contact and the electrode of the main housing after attachment of the device. That is, it is possible to ensure a good electrical connection by the first spring, and at the same time make the device easy to attach to the image forming apparatus.

The first arm may be is bent to have a first bend portion formed therein. The frame may have a contact surface that is caused to contact the first bend portion by an elastic force of the second spring when the device is not attached to the main housing.

The first arm may be configured to comprise a first extension portion with which one end of the second spring is engaged and that extends from the one end of the coil in an axial direction of the coil, and a second extension portion extending from the first extension portion in a direction away from a center of the coil to the first bend portion.

The first spring may consist of a single metal wire.

The electrical contact preferably, but not necessarily, has a sharp edge. The electrical contact having a sharp edge can improve the electrical continuity between the electrode of the main housing and the electrical contact.

The second arm may be bent to have a second bend portion formed therein. The second bend portion may be configured to protrude outward from the frame when the device is not attached to the main housing, and pushed by the main housing when the device is being attached to the main housing.

The second arm may be bent to have a third bend portion formed at an end thereof and engageable with the frame. The third bend portion may be caused to engage with the frame when the first spring is caused to rotate in the one direction of rotation.

The device may comprise a heating member configured to heat a sheet and a pressure member configured to press the sheet against the heating member. The second spring may electrically connect the heating member and the first spring and serve as a conductor wire for grounding the heating member.

According to such configuration, since the second spring also serves as the conductor wire for grounding the heating member, the number of parts can be restrained from increasing.

The device may be configured to comprise a pressure arm configured to contact the heating member at a side of the heating member opposite to a side on which the pressure member is located, and a third spring that biases the pressure arm in such a manner that the heating member is pressed against the pressure member, wherein the first arm includes a first extension portion extending from the one end of the coil in an axial direction of the coil, and wherein one end of the second spring is engaged with the first extension portion, and another end of the second spring is engaged with the third spring.

In another aspect, a spring for grounding a device for an image forming apparatus disclosed herein comprises a coil, a first arm, and a second arm. The coil is fitted on an outer periphery of a boss formed on a frame of the device. The first arm extends from one end of the coil. The first arm includes at an end thereof an electrical contact configured to contact an electrode of a main housing of the image forming apparatus. The second arm extends from another end of the coil in a direction different from a direction in which the first arm extends.

The first arm includes a first extension portion, a second extension portion, and an end portion. One end of a second spring is engaged with the first extension portion. The first extension portion extends from the one end of the coil in an axial direction of the coil. The second extension portion extends from the first extension portion in a direction away from a center of the coil. The end portion includes an end forming the electrical contact. The end portion extends from the second extension portion at an angle with respect to the second extension portion.

When the device is not attached to the main housing, the spring is biased by the second spring, whereby the electrical contact is located in a retracted position. When the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode.

According to such spring, the second arm is pushed by the main housing and causes the first arm to rotate about the boss when the device is being attached to the main housing. Therefore, the electrical contact can easily protrude further outward of the frame than when the electrical contact is located in the retracted position.

The above and other aspects, their advantages and further features will become more apparent by describing in detail illustrative, non-limiting embodiments thereof with reference to the accompanying drawings briefly described below:

Figure 1:
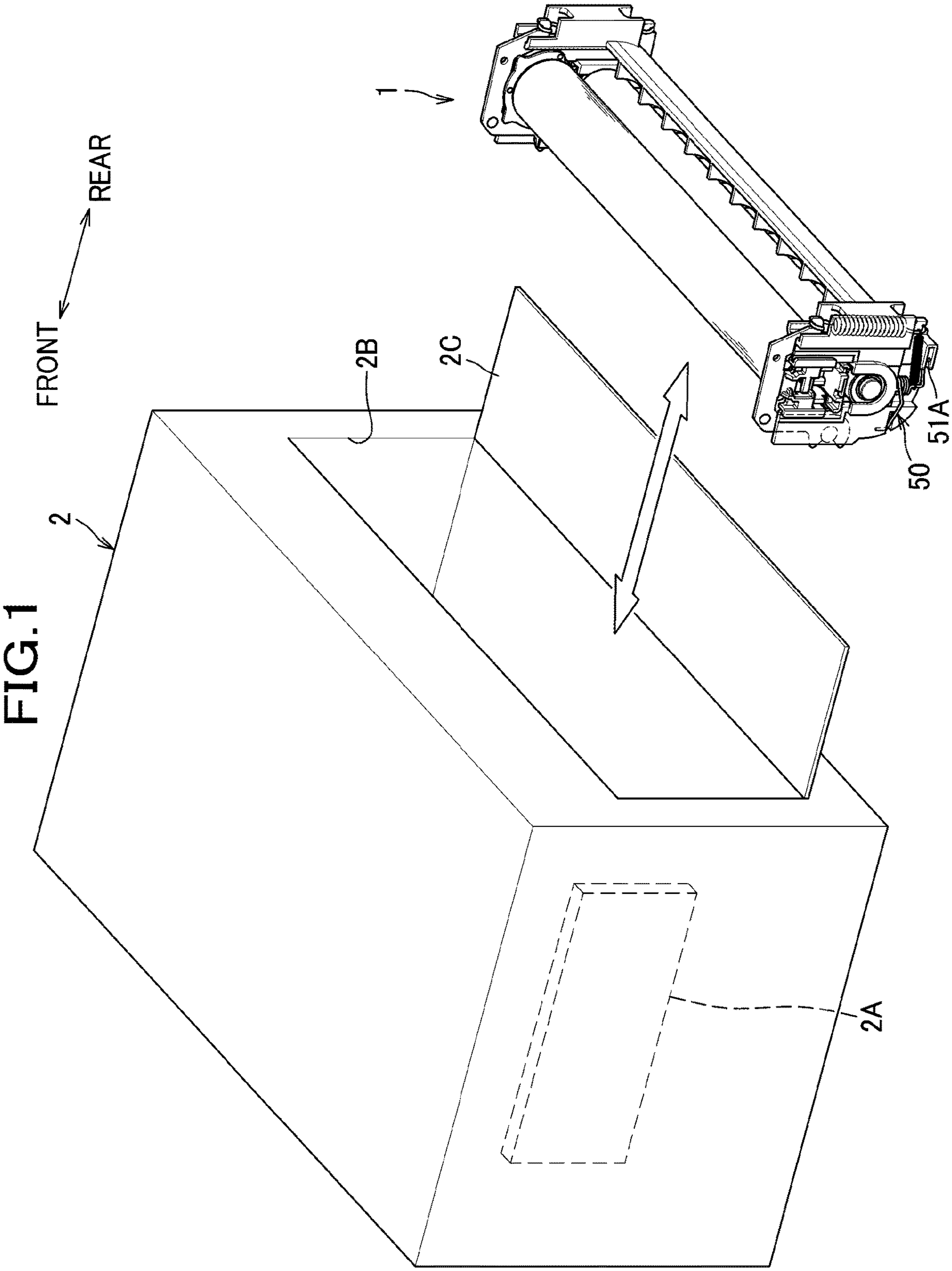
FIG. 1 is an illustration of a main housing and a fixing device.

As shown in FIG. 1, a replaceable device 1 as a device of the present example is a component attachable to and detachable from a main housing 2 of an image forming apparatus. The replaceable device 1 is, as one example, a fixing device for thermally fixing a toner image onto a sheet. The replaceable device 1 is inserted into the main housing 2 through an opening 2B which can be made accessible by opening a cover 2C provided on a rear side of the main housing 2. The main housing 2 includes an electrode 2A. The electrode 2A is a metal sheet that also serves as a frame of the main housing 2. The electrode 2A is electrically grounded. The replaceable device 1 comprises a contact spring 50 as a first spring. An electrical contact 51A of the contact spring 50 is electrically connected to the electrode 2A when the replaceable device 1 is attached to the main body 2, as will be described later.

Figure 2:
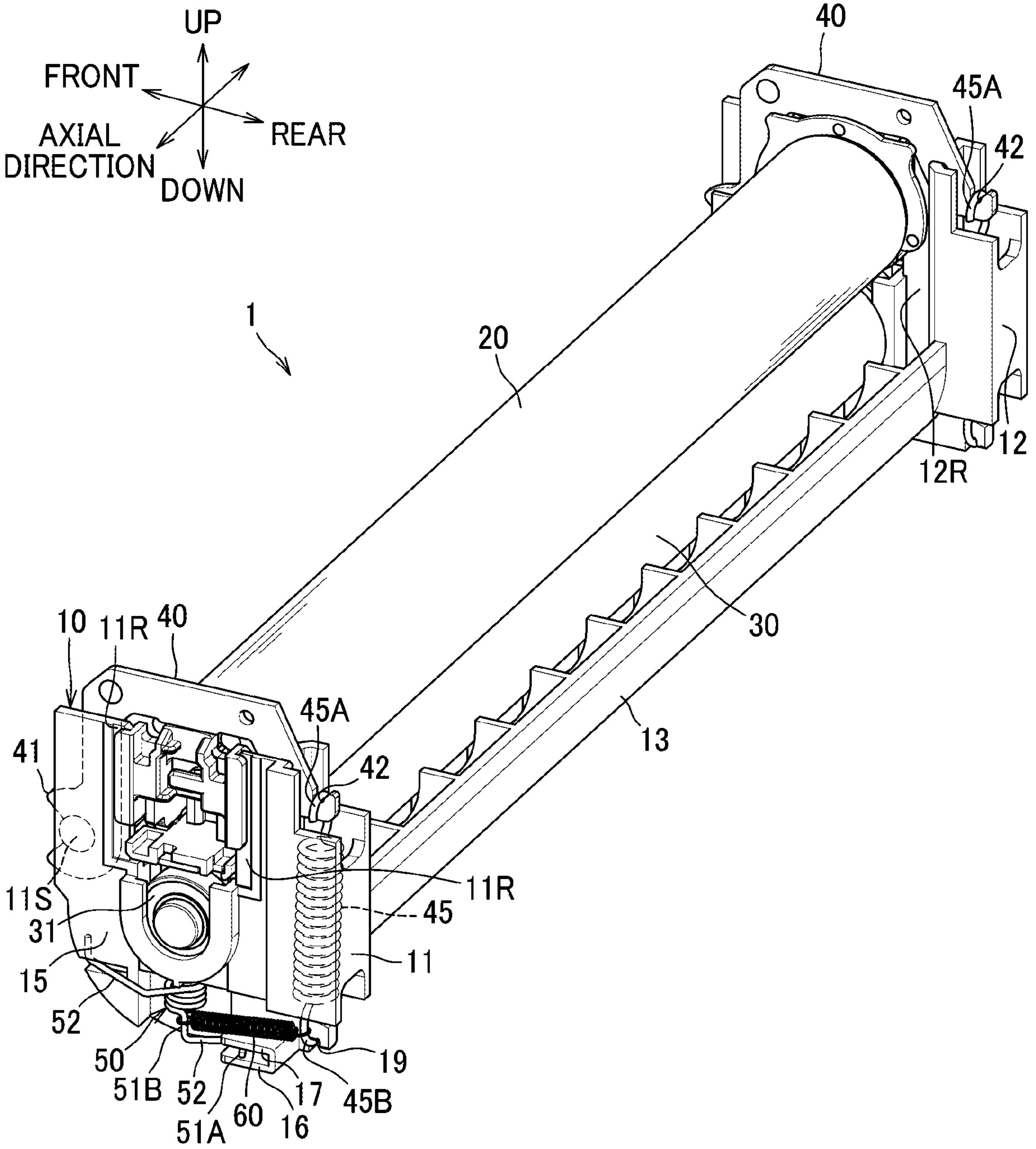
FIG. 2 is a perspective view of the fixing device.

As shown in FIG. 2, the replaceable device 1 comprises a frame 10, a heating member 20, a pressure member 30, a pair of pressure arms 40, a pair of pressure springs 45, a contact spring 50, and a mechanical spring 60 as a second spring. A detailed configuration of the frame 10 is omitted in FIG. 2.

The frame 10 mainly comprises side walls 11, 12 and a connection portion 13. The side walls 11, 12 are located apart from each other in an axial direction of the pressure member 30 (hereinafter referred to simply as "axial direction"). The connection portion 13 connects the side walls 11, 12. In the following description, up/down (upward/downward) directions as shown in FIG. 2 are referred to as up/down (upward/downward) directions. Further, the direction toward the left and the direction toward the right of FIG. 2 are respectively referred to as front and rear (forward and rearward) directions. The front/rear directions are perpendicular to the up/down directions and to the axial direction. The side walls 11, 12 have shapes of the letter U with an open side facing upward (see also FIG. 4). Each side wall 11, 12 has a pair of rails 11R, 12R extending parallel to each other. Each pair of rails 11R, 12R is located on the inner sides of the U-shaped portion of a corresponding side wall 11, 12. One of the pressure arms 40, the contact spring 50, and the mechanical spring 60 are attached to one side wall 11. The other side wall 12 has a structure approximately symmetrical in the axial direction to that of the one side wall 11, except for structures related to attachment of the contact spring 50 and the mechanical spring 60. Thus, only the structure of the one side wall 11 will be described below.

The heating member 20 is a member for heating a sheet. The heating member 20 comprises a heater (not shown) and a belt that rotates around the heater. End portions of the heating member 20 located apart from each other in the axial direction are engaged with corresponding rails 11R, 12R. The heating member 20 which thus can be guided by the rails 11R, 12R is thereby rendered slidable in the up/down direction.

The pressure member 30 is a member for pressing a sheet against the heating member 20. The pressure member 30 is a roller comprising a metal shaft and an elastic member that covers an outer cylindrical surface of the shaft. The pressure member 30 is rotatably supported by the side walls 11, 12 via bearings 31.

The pressure arm 40 is comprised of a metal sheet having a shape of the letter U with an open side facing downward. One end of the pressure arm 40 is rotatably supported by a shaft 11S provided on the side wall 11 of the frame 10. A center portion of the pressure arm 40 is in contact with a corresponding end portion of the heating member 20 from above. The pressure arm 40 is configured to contact the heating member 20 at a side of the heating member 20 opposite to a side on which the pressure member 30 is located. The other end of the pressure arm 40 has a recess 42. A pressure spring 45 as a third spring is a tension spring formed of a metal wire. The pressure spring 45 has a hook 45A on one end and a hook 45B on the other end. The hook 45A formed on the one end of the pressure spring 45 is hooked onto the recess 42 of the pressure arm 40. The side wall 11 includes a recess 19 provided below the recess 42 of the pressure arm 40. The hook 45B formed on the other end of the pressure spring 45 is hooked onto the recess 19 of the side wall 11. The pressure spring 45 biases the pressure arm 40 downward at all times. A corresponding end portion of the pressure member 20 is thereby pushed by the pressure arm 40 from above; thus, the heating member 20 is pressed against the pressure member 30.

Figure 3A:
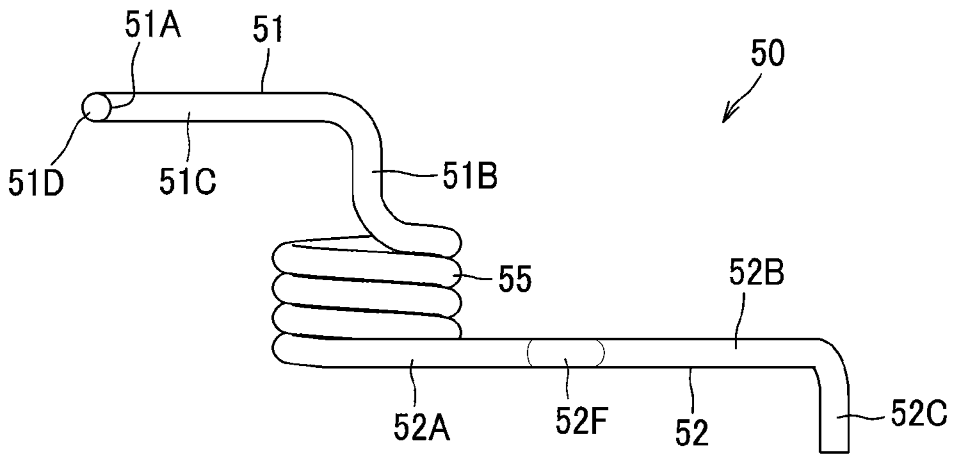
FIG. 3A is a plan view of a contact spring.
Figure 3B:
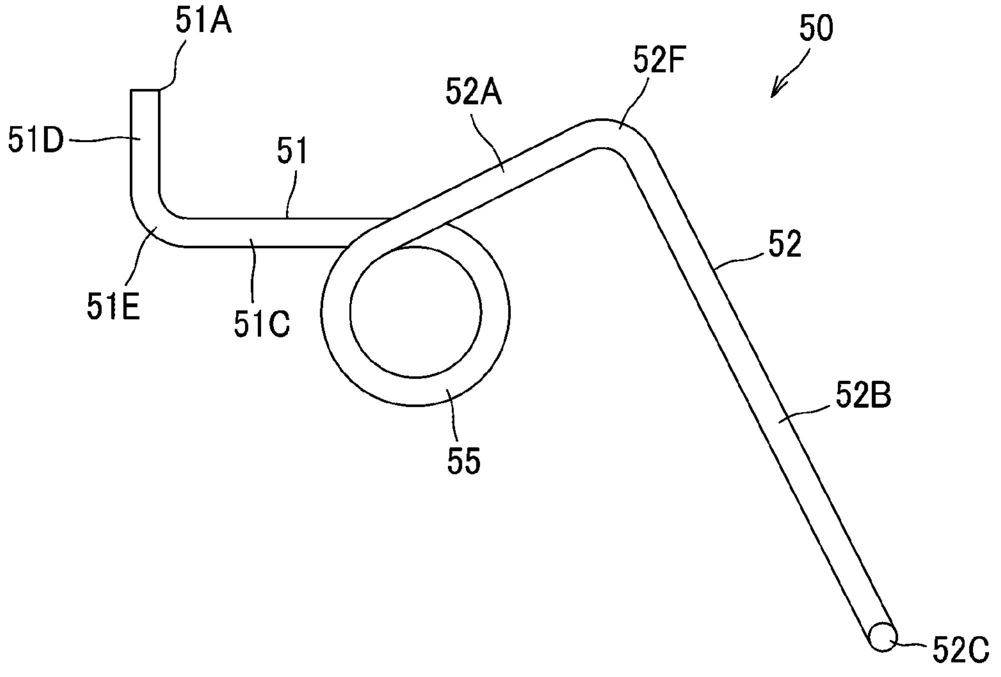
FIG. 3B is a front view of the contact spring.

As shown in FIGS. 3A and 3B, the contact spring 50 is comprised of a torsion coil spring. The contact spring 50 is formed of a metal wire. The contact spring 50 includes a coil 55, a first arm 51 extending from one end of the coil 55, and a second arm 52 extending from the other end of the coil 55 in a direction different from a direction in which the first arm extends.

Figure 4:
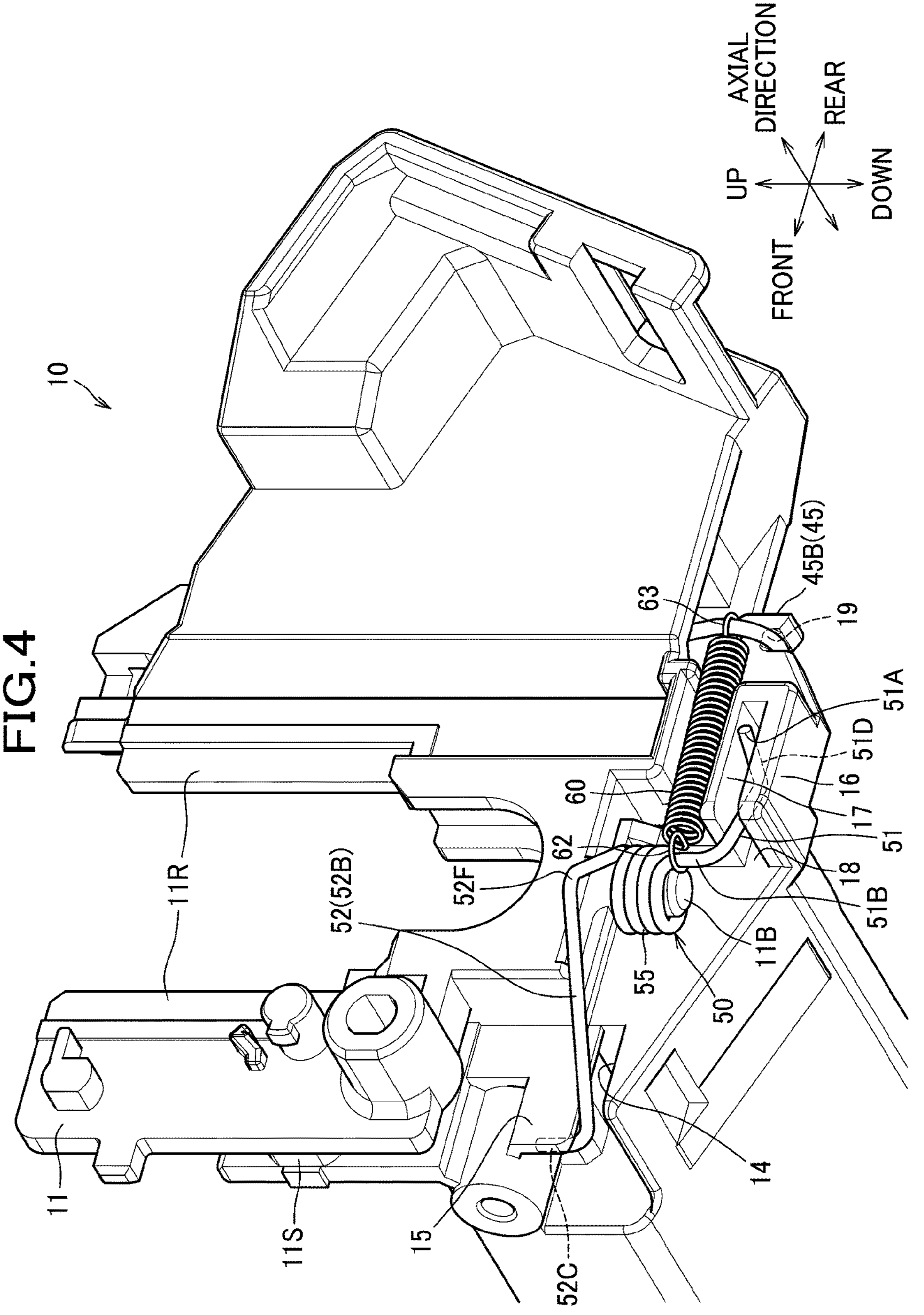
FIG. 4 is a perspective view of a frame of the fixing device as viewed diagonally from below.

As shown in FIGS. 2 and 4, the side wall 11 includes a boss 11B (see FIG. 4) located under the bearing 31 and protruding downward. The coil 55 is fitted on an outer periphery of the boss 11B and is thereby supported by the boss 11B. The contact spring 50 is rotatable about the boss 11B.

Referring back to FIGS. 3A and 3B, the first arm 51 includes at an end thereof an electrical contact 51A that contacts the electrode 2A of the main body 2. Specifically, the first arm 51 includes a spring hitch portion 51B as a first extension portion, an extension portion 51C as a second extension portion, a hook portion 51D, and a bend portion 51E as a first bend portion. The first arm 51 is bent between the spring hitch portion 51B and the extension portion 51C, and between the extension portion 51C and the hook portion 51D. The bend portion 51E is a bend formed between the extension portion 51C and the hook portion 51D.

Figure 5A:
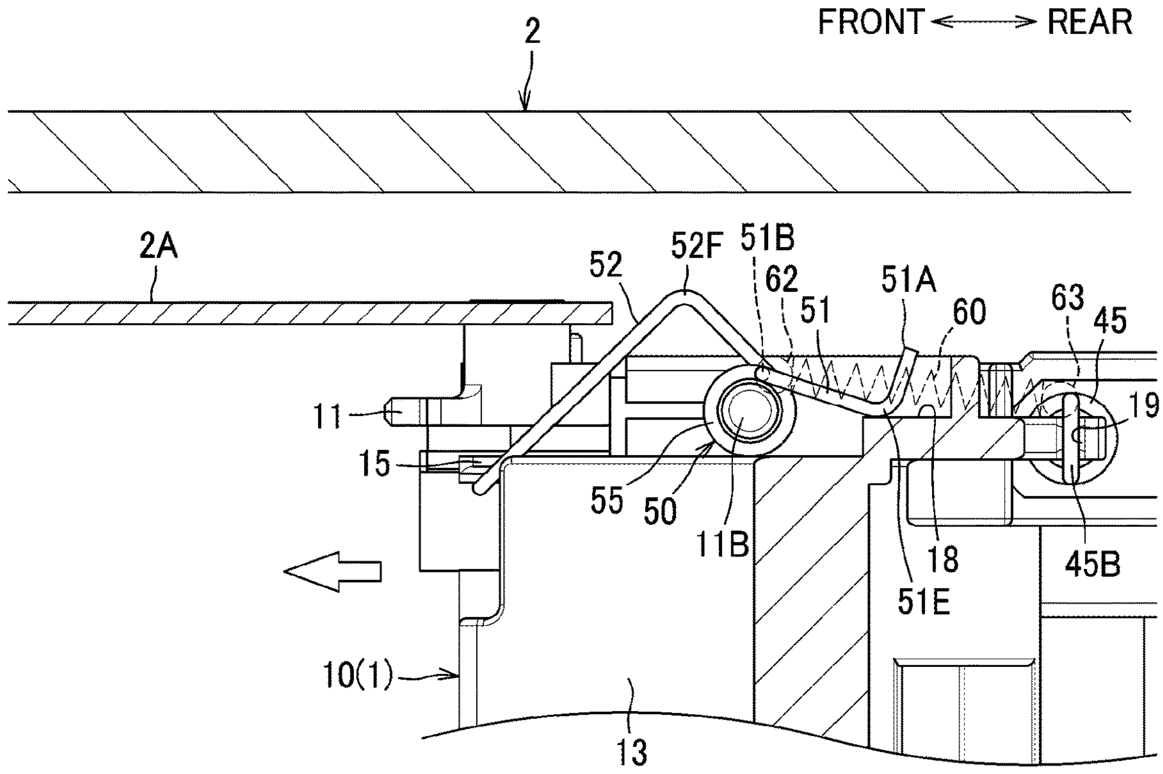
FIG. 5A is an illustration showing the contact spring approaching an electrode before a replaceable device is attached to the main housing.

The spring hitch portion 51B extends from the one end of the coil 55 in an axial direction of the coil 55. As shown in FIGS. 2 and 5A, the one end 62 of the mechanical spring 60 is engaged with the spring hitch portion 51B. The mechanical spring 60 is a tension spring. The other end 63 of the mechanical spring 60 is engaged with the hook 45B of the pressure spring 45. The contact spring 50 is thereby biased by the mechanical spring 60 in one direction of rotation in which the contact spring 50 is rotatable about the boss 11B. Specifically, the contact spring 50 is biased in the clockwise direction of FIG. 5A.

As shown in FIGS. 4 and 5A, the frame 10 has a contact surface 18 that is caused to contact the bend portion 51E by an elastic (biasing) force of the mechanical spring 60 when the replaceable device 1 is not attached to the main housing 2. When the replaceable device 1 is not attached to the main housing 2, the bend portion 51E is in contact with the contact surface 18 to locate the first arm 51 in position. The position in which the electrical contact 51A is located at this time is the retracted position. When the contact spring 50 is not in contact with the electrode 2A, as shown in FIG. 5A, the replaceable device 1 is not completely attached to the main housing 2, and this state is thus described as a state in which the replaceable device 1 is not attached to the main housing 2.

Referring back to FIGS. 3A, 3B, the extension portion 51C extends from the spring hitch portion 51B in a direction away from a center of the coil 55 (e.g., perpendicular to the axial direction of the coil 55) to the bend portion 51E. The first arm 51 is bent at the bend portion 51E. The hook portion 51D extends from the extension portion 51C (from the bend portion 51E) in a direction perpendicular to the axial direction of the coil 55. The electrical contact 51A is an end of the first arm 51 having a sharp edge. The electrical contact 51A has shape of an unprocessed section of a cut-off metal wire, i.e., the electrical contact 51A is not subjected to any process such as rounding and has a sharp edge. In FIGS. 3A and 3B, the electrical contact 51A is shown to have a clean edge formed by cutting a metal wire at a right angle. However, the electrical contact 51A may have a non-constant shape such as, for example, a shape on which a shape of a cutting-tool blade is transferred.

The second arm 52 includes a second extension portion 52A, a third extension portion 52B, a retainer portion 52C as a third bend portion, and a to-be-pushed portion 52F as a second bend portion. The second arm 52 is bent between the second extension portion 52A and the third extension portion 52B, and between the third extension portion 52B and the retainer portion 52C.

The second extension portion 52A extends from the other end of the coil 55 in a direction away from the center of the coil 55 (e.g., perpendicular to the axial direction of the coil 55).

The third extension portion 52B extends from an end of the second extension portion 52A located farther from the coil 55, at an angle with respect to the second extension portion 52A. The third extension portion 52B extends in a direction perpendicular to the axial direction of the coil 55 and different from the direction in which the second extension portion 52A extends. One bend of the second arm 52 located between the second extension portion 52A and the third extension portion 52B is the to-be-pushed portion 52F. As shown in FIGS. 4 and 5A, the to-be-pushed portion 52F is bent such as to protrude outward from the frame 10 when the replaceable device 1 is not attached to the main housing 2.

Referring back to FIGS. 3A and 3B, the retainer portion 52C extends from an end of the third extension portion 52B distant from the coil 55, parallel to the axial direction.

As shown in FIG. 4, the frame 10 includes a slit 14 and a retainer wall 15 frontward of the boss 11B. The slit 14 is elongated in a direction perpendicular to the axis of the boss 11B. The retainer wall 15 is located adjacent to the slit 14. The second arm 52 is located in such a position that the third extension portion 52B is inserted in the slit 14 and the retainer portion 52C extends behind the retainer wall 15, i.e., on a side of the retainer wall 15 opposite to a side on which the to-be-pushed portion 52F is located. The retainer portion 52C can thereby be engaged with the retainer wall 15 when the contact spring 50 is caused to rotate in the one direction of rotation, i.e., the direction of rotation that causes the to-be-pushed portion 52F to protrude from the frame 10.

The frame 10 includes a first protection wall 16 and a second protection wall 17. When the replaceable device 1 is not attached to the main housing 2, the first protection wall 16 is located on one side of the hook portion 51D in the axial direction of the coil 55, and the second protection wall 17 is located on the other side of the hook portion 51D in the axial direction of the coil 55. In other words, when the replaceable device 1 is not attached to the main housing 2, the hook portion 51D is located in the clearance between the first protection wall 16 and the second protection wall 17. When the replaceable device 1 is not attached to the main housing 2, the electrical contact 51A protrudes outward from the first protection wall 16 and the second protection wall 17 by only a small amount. The electrical contact 51A is thereby protected by the first protection wall 16 and the second protection wall 17 and less likely to get caught on other objects when the replaceable device 1 is not attached to the main housing 2. Preferably, but not necessarily, when the replaceable device 1 is not attached to the main housing 2, the electrical contact 51A does not protrude outward from the first protection wall 16 and the second protection wall 17 and is located therebetween. The electrical contact 51A not protruding outward from the frame 10 as described above makes the electrical contact 51A further less likely to get caught on other objects.

According to the above configuration, the mechanical spring 60 is electrically connected to the heating member 20 via the pressure spring 45 and the pressure arm 40 (see FIG. 2). Since the mechanical spring 60 is in contact with the spring hitch portion 51B of the contact spring 50, the mechanical spring 60 electrically connects the heating member 20 and the contact spring 50 and serves as a conductor wire for grounding the heating member 20.

The operation and advantageous effects of the contact spring 50 in the replaceable device configured as described above will be described.

As shown in FIG. 5A, as the replaceable device 1 is attached to the main body 2 from the back toward the front, the second arm 52 of the contact spring 50 approaches the electrode 2A. Since the electrical contact 51A of the contact spring 50 barely protrudes from the frame 10, the electrical contact 51A is less likely to get caught on other objects before the electrical contact 51A approaches the electrode 2A.

Figure 5B:
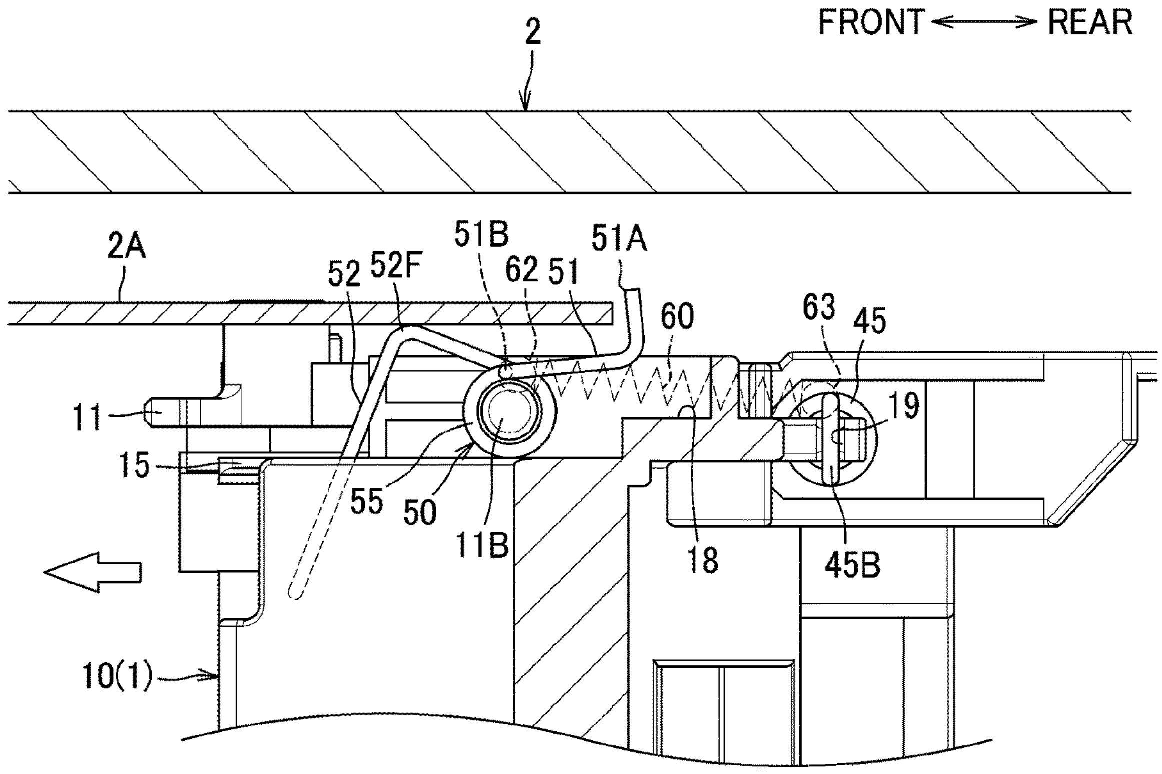
FIG. 5B is an illustration showing the contact spring having been rotated in the process of the replaceable device being attached to the main housing.

As shown in FIG. 5B, when the replaceable device 1 is further pushed to the front from the position shown in FIG. 5A, the to-be-pushed portion 52F of the second arm 52 is pushed by the electrode 2A. This causes the second arm 52 to rotate about the boss 11B in the counter-clockwise direction of FIG. 5 which in turn causes the coil 55 and the first arm 51 to also rotate about the boss 11B in the counter-clockwise direction. The electrical contact 51A is thereby located in a protruding position in which the electrical contact 51A protrudes further outward of the frame 10 than when the electrical contact 51A is located in the retracted position.

Figure 6:
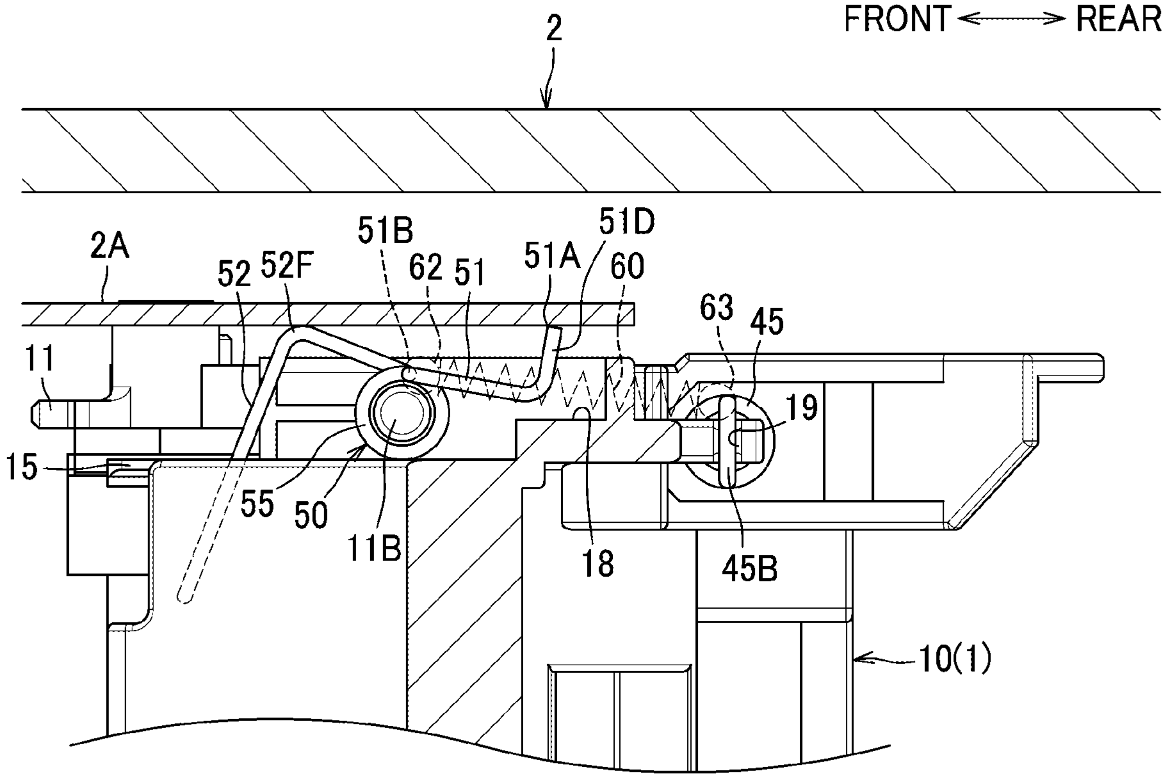
FIG. 6 is an illustration showing the contact spring of which an electrical contact is in contact with the electrode after attachment of the replaceable device to the main housing.

As shown in FIG. 6, when the replaceable device 1 is further pushed to the front, the hook portion 51D is pushed by the electrode 2A and causes the first arm 51 to rotate in the clockwise direction about the boss 11B, so that the electrical contact 51A contacts the surface of the electrode 2A. In the process of the replaceable device 1 moving forward, a sharp edge of the electrical contact 51A moves forward while scratching the surface of the electrode 2A. In this way, even if a coating or a layer of oxide exists on the surface of the electrode 2A, the electrical contact 51A scratches off such coating or layer, so that the metal portion of the electrode 2A and the electrical contact 51A are securely electrically connected.

According to the replaceable device 1 of the present example, since the electrical contact 51A at the end of the first arm 51 is located in the retracted position when the replaceable device 1 is not attached to the main housing 2, the electrical contact 51A is less likely to get caught on other objects during assembly. On the other hand, since the second arm 52 is pushed by the main housing 2 and causes the first arm 51 to rotate about the boss 11B when the replaceable device 1 is being attached to the main housing 2, which in turn causes the electrical contact 51A to protrude further outward of the frame 10 than when the electrical contact 51A is located in the retracted position, it is easier to ensure electrical continuity between the electrical contact 51A and the electrode 2A of the main housing 2 after attachment of the removable device 1. That is, it is possible to ensure a good electrical connection by the contact spring 50, and at the same time make the replaceable device 1 easy to attach to the image forming apparatus.

Since the electrical contact 51A has a sharp edge, the electrical contact 51A can scratch off a coating or layer of oxide formed on the surface of the electrode 2A and improve the electrical continuity between the electrode 2A and the electrical contact 51A.

Since the mechanical spring 60 also serves as the conductor wire for grounding the heating member 20, the number of parts can be restrained from increasing.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, although the contact spring 50 is disposed in such a position that the second arm 52 enters the main housing 2 before the first arm 51 when the replaceable device 1 is being attached to the main housing 2, the contact spring 50 may be disposed in such a position that the first arm 51 enters the main housing 2 before the second arm 52 when the replaceable device 1 is being attached to the main housing 2.

The contact spring 50 may not include the retainer portion 52C. For example, when the electrical contact 51A is located in the retracted position, the second arm 52 may be formed in such a shape that the end of the second arm 52 does not protrude outward from the frame.

The replaceable device 1 is not limited to a fixing device and may be a development cartridge or a drum cartridge.

The elements described in the above example embodiment and its modified examples may be implemented selectively and in combination.

What is claimed is:

1. A device for an image forming apparatus, comprising:

a frame including a boss;

a first spring including a coil fitted on an outer periphery of the boss and supported by the boss; and a second spring that mechanically biases the first spring in one direction of rotation in which the first spring is rotatable about the boss, wherein the first spring comprises:

a first arm extending from one end of the coil, the first arm including at an end thereof an electrical contact configured to contact an electrode of a main housing of the image forming apparatus; and a second arm extending from another end of the coil in a direction different from a direction in which the first arm extends, wherein the first arm is bent to have a first bend portion formed therein, wherein the frame has a contact surface that is caused to contact the first bend portion by an elastic force of the second spring when the device is not attached to the main housing, wherein the first arm comprises:

a first extension portion with which one end of the second spring is engaged, the first extension portion extending from the one end of the coil in an axial direction of the coil; and a second extension portion extending from the first extension portion in a direction away from a center of the coil to the first bend portion, wherein when the device is not attached to the main housing, the first spring is biased by the second spring, whereby the electrical contact is located in a retracted position, and wherein when the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode.

2. The device according to claim 1, wherein the first spring consists of a single metal wire.

3. The device according to claim 1, wherein the electrical contact has a sharp edge.

4. A device for an image forming apparatus, comprising:

a frame including a boss;

a first spring including a coil fitted on an outer periphery of the boss and supported by the boss, and a second spring that mechanically biases the first spring in one direction of rotation in which the first spring is rotatable about the boss, wherein the first spring comprises:

a first arm extending from one end of the coil, the first arm including at an end thereof an electrical contact configured to contact an electrode of a main housing of the image forming apparatus; and a second arm extending from another end of the coil in a direction different from a direction in which the first arm extends, wherein when the device is not attached to the main housing, the first spring is biased by the second spring, whereby the electrical contact is located in a retracted position, and wherein when the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode, wherein the second arm is bent to have a second bend portion formed therein, wherein the second arm is bent to have a second bend portion formed therein, wherein the second bend portion protrudes outward from the frame when the device is not attached to the main housing, and, wherein the second bend portion is pushed by the main housing when the device is being attached to the main housing.

5. A device for an image forming apparatus, comprising:

a frame including a boss;

a first spring in ding a coil fitted of periphery of the boss and supported by the boss, and a second spring that mechanically biases the first spring in one direction of rotation in which the first spring is rotatable about the boss;

wherein the first spring comprises:

a first arm extending from one end of the coil, the first arm including at an end thereof an electrical contact configured to contact an electrode of a main housing of the image forming apparatus; and a second arm extending from another end of the coil in a direction different from a direction in which the first arm extends, wherein the second arm is bent to have a third bend portion formed at an end thereof, the third bend portion being engageable with the frame, wherein the third bend portion is caused to engage with the frame when the first spring is caused to rotate in the one direction of rotation, wherein when the device is not attached to the main housing, the first spring is biased by the second spring, whereby the electrical contact is located in a retracted position, and wherein when the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retracted position and contacts the electrode.

6. A device for an image forming apparatus, comprising:

a frame including a boss;

a first spring including a col fitted on an outer periphery of the boss and supported by the boss;

a second spring that mechanically biases the first spring in one direction of rotation in which the first spring is rotatable about the boss;

a heating member configured to heat a sheet;

a pressure member configured to press the sheet against the heating member;

a pressure arm configured to contact the heating member at a side of the heating member opposite to a side on which the pressure member is located; and a third spring that biases the pressure arm in such a manner that the heating member is pressed against the pressure member, wherein the first spring comprises:

a first arm extending from one end of the coil, the first arm including at an end thereof an electrical contact configured to contact an electrode of a main housing of the image forming apparatus; and a second arm extending from another end of the coil in a direction different from a direction in which the first arm extends, wherein the first arm includes a first extension portion extending from the one end of the coil in an axial direction of the coil, wherein one end of the second spring is engaged with the first extension portion, and another end of the second spring is engaged with the third spring, wherein the second spring electrically connects the heating member and the first spring and serves as a conductor wire for grounding the heating member, wherein when the device is not attached to the main housing, the first spring is biased by the second spring, whereby the electrical contact is located in a retracted position, and wherein when the device is being attached to the main housing, the second arm is pushed by the main housing and causes the first arm to rotate about the boss, whereby the electrical contact is located in a protruding position in which the electrical contact protrudes further outward of the frame than when the electrical contact is located in the retraced position and contacts the electrode.

* * * * *